United States Patent [19]

Bryant

[11] Patent Number: 4,662,138

[45] Date of Patent: May 5, 1987

[54] CONNECTOR FOR PANEL EDGES

[76] Inventor: Peter E. Bryant, 10227 Disney Cir., Huntington Beach, Calif. 92646

[21] Appl. No.: 773,032

[22] Filed: Sep. 6, 1985

[51] Int. Cl.⁴ .............................................. E04B 1/00
[52] U.S. Cl. ...................................... 52/282; 52/468
[58] Field of Search ................. 52/282, 461, 464, 468, 52/471, 584, 582, 588, 762, 763, 770, 771, 772; 403/205, 231, 403

[56] References Cited

U.S. PATENT DOCUMENTS

| | | | |
|---|---|---|---|
| 3,261,493 | 7/1966 | Smith | 52/282 X |
| 3,440,790 | 4/1969 | Nerem | 52/468 X |
| 3,893,269 | 7/1975 | Nelsson et al. | 52/282 X |
| 4,373,304 | 2/1983 | Howitt | 52/282 X |
| 4,385,850 | 5/1983 | Bobath | 52/461 X |

Primary Examiner—William F. Pate, III
Assistant Examiner—Creighton Smith
Attorney, Agent, or Firm—Robert R. Finch

[57] ABSTRACT

Panel joining means that include a pair of identical elongated edge connectors secured along one edge of each panel to be joined and a bridge for attachment between the connectors. The edge connectors are cut from a single extrusion, are positioned to face each other, and are dimensioned so they can be secured to the panel before the finish lamina is applied by rollers or presses. The bridge is an extrusion that is symmetrical in cross section. It has continuous flanges along each side that register with complementary flanges on the connectors to complete positioning of the panels for joining. Changing configuration of only the bridge web will change the angle between adjoining panels.

5 Claims, 8 Drawing Figures

CONNECTOR FOR PANEL EDGES

FIELD AND BACKGROUND

This invention relates generally to wall structures, in particular to laminated walls and specifically to means for connecting transverse panels along their edges.

In the usual construction, adjacent transverse panels are connected by means of spaced apart inside or outside angle braces fastened to the panel surfaces. In the case of hollow laminated panels, connectors are sometimes provided that can be inserted into the edges of the panels, and the panels secured by fasteners through the panel. Seams at the corners are then covered by additional overlays, finished angles or the like. In such structures it is difficult to obtain a neat appearing finished product. Also, the connection between adjacent panels is not continuous hence, is relatively weak.

SUMMARY AND BRIEF DESCRIPTION OF INVENTION

It is the primary object of this invention to provide means for joining the edges of transverse panels along the entire edge.

Another object is the provision of panel joining means especially adapted for use on laminated panels.

One object of particular value is provision of a panel joining system enabling several configurations of final product, while requiring only two different extruded elements.

A further object is the provision of panel joining means that include connecting elements which may be made an integral part of the panels so they can be in place when the panel is passed between opposed press rollers. Thereafter, the elements are accessible for connection into the joint.

Yet another object is the provision of panel joining means of the type described in which adjacent panels are provided with integral elements and a co-operative bridging element enables connection of the panels to each other through said bridge.

Another important object is the provision of panel-joining means which facilitate the production assembly of panels to form an enclosure.

A related further object is the provision, in panel joining means of the type described, of means forming in the joint a duct for enclosing service elements such as electrical or gas lines.

Still another object is the provision of panel joining means of a design especially adapted for joining side walls to each other and roof or covers to side walls. The enclosures are not limited to cubical or rectangular shapes, but may take any predesigned form.

The foregoing and probably other objects of the invention are attained by an assembly that includes an edge connector secured to and extending along the edge of each panel to be joined; and a bridge or interconnector element that accepts both edge connectors and establishes them in a preselected final position for joining.

According to the invention, the edge connectors are of dimension and configuration to be entirely contained within the outer dimension of the panel to which they are joined. Then, when the panel is formed by lamination, the edge connectors are in place in the finished panel.

The edge connectors for the panels are usually identical and the bridge element is symmetrical to accept both connectors—one along each side of the bridge.

Design of the edge connectors and bridges are critical for several reasons. First, the parts should be easily extrudable with simple dies, and, second, the various channels and faces of the element should be easily accessible for riveting during assembly.

The shapes of the extruded parts establish the final configuration of the structure resulting from connecting adjacent panels. The edge connectors that are secured to the panel edges are all cut from the same extrusion while the bridge element is cut from a separate extrusion. To change the angle between adjacent panels, only the bridge element need be changed.

By securing the connectors to the panel frame prior to lamination the panels are ready for assembly as soon as they reach the assembly area; and the only required connection to be made is between the edge connectors and the bridge.

The configurations of the several elements such as connectors and bridges are co-ordinated so that, when assembled, they define the final contour of the enclosure. Also, they form and enclose ducts in the joint.

In order that the invention may be more readily understood and carried into effect reference is made to the accompanying drawings and description thereof which are offered by way of example only and not in limitation of the invention the scope of which is defined by the claims, including equivalents embraced therein rather than by any preceding description.

DETAILED DESCRIPTION OF INVENTION

Figure 1:
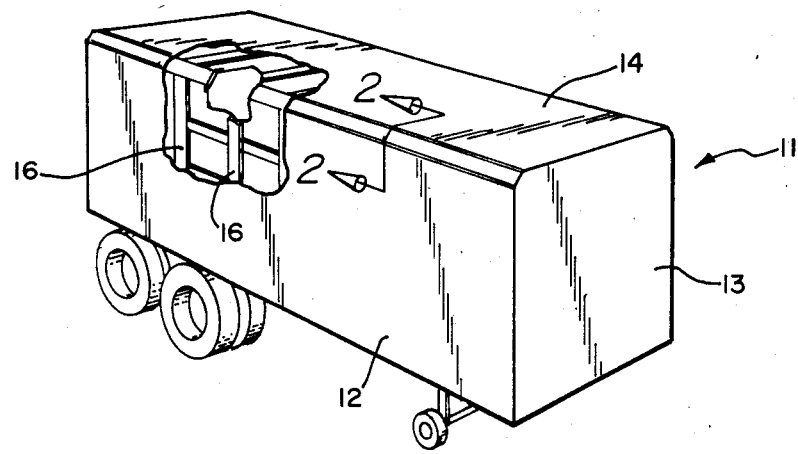
FIG. 1 is a perspective of a box trailer embodying the invention, a portion being cut away.

In the description and in the claims the terms upwardly and/or outwardly are intended to mean in a direction away from the panels or the enclosure formed by joining panels. The invention finds particular use in structures, such as a cargo trailer 11, formed from a plurality of laminated sidewalls 12, end walls 13 and a roof 14. As shown in the cut-away section of FIG. 1, the wall panels are laminated and include a framework 16 onto which are laminated finished panels 17.

An assembly edge connector 18 is secured along the full length the edges 19 of panels to be joined. Then, the combination of the connectors 18 and the bridge element 20 of this invention co-operate to form a corner or junction 21 which may be of any angularity between adjacent panels 12–14.

Figure 2:
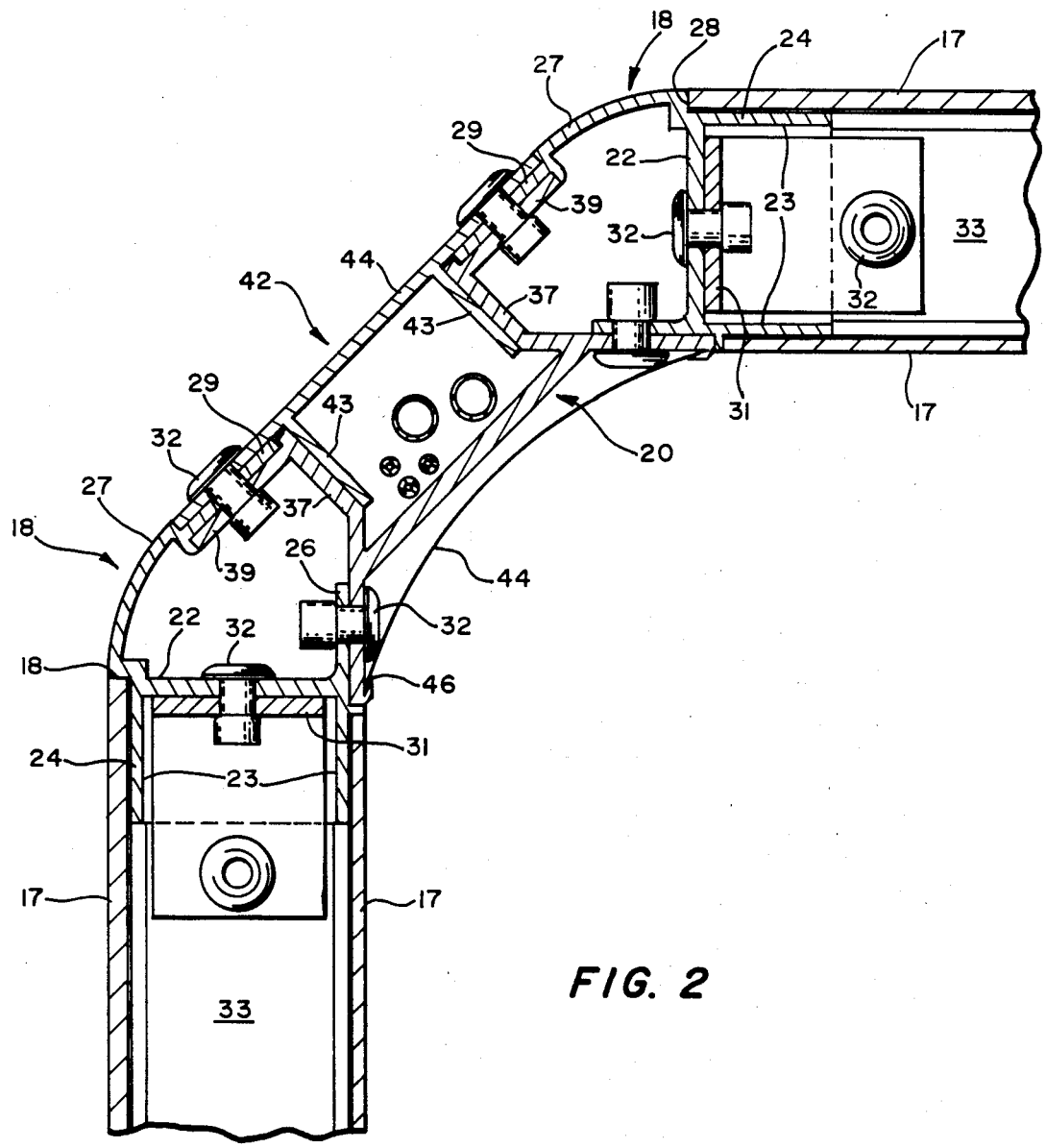
FIG. 2 is an enlarged section taken in the plane of line 2—23 of FIG. 1 looking in the direction of arrows 2.
Figures 3, 4, 5, 6:
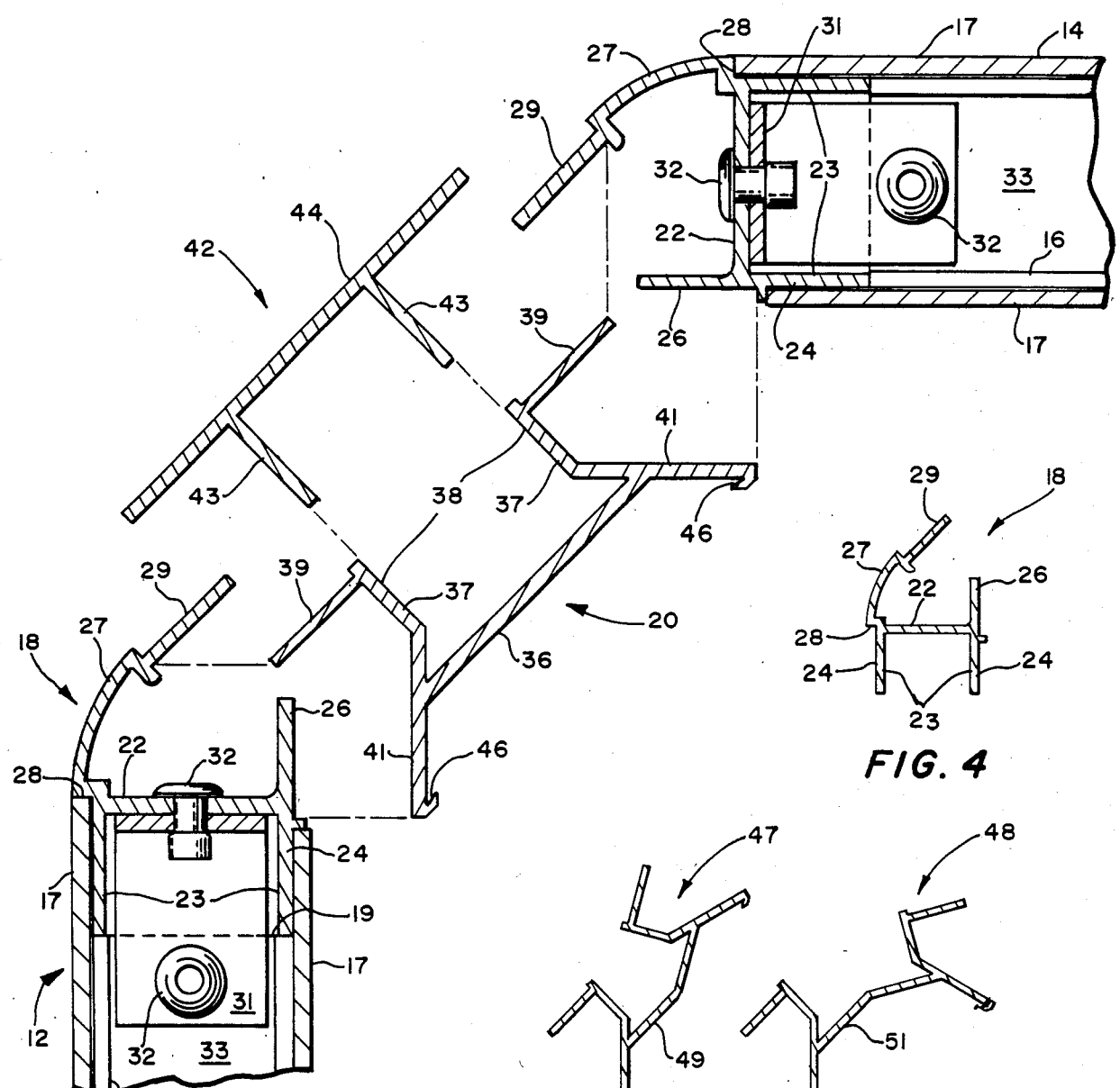
FIG. 3 is an exploded view of the assembly of FIG. 2.
FIG. 4 is a sectional view of one of the edge connectors of the invention.
FIG. 5 is a sectional view of a modified form of the connecting bridge extrusion.
FIG. 6 is a sectional view of another form of bridge.

As best shown by FIGS. 2 and 3, the assembly comprises a pair of edge connectors 18 that are identical, but are positioned on the adjacent panels to be mirror images of each other. These are connected to each other by a single extruded bridge 20 that extends between the two edge connectors and is secured to both as shown in FIG. 2.

The connector 18 is an extrusion that, viewed in cross-section, is asymmetrical and includes a base web 22 which co-operates with spaced apart legs or flanges 23 extending at right angles from one side thereof to form a channel 24 facing the panel edge 19. Extending from the opposite side of the base web 22 is a flat flange, 26. This is located adjacent the inside face of the panel. That is, the inside wall of the trailer. Extending from the opposite side of the base web 22 is a curved wall 27 that forms part of the finished joint and is offset from the leg 23 so that the surface of the framework 16 and the flange 23 are in the same plane whereby the finished panel 17 covers them both. The panel is received in the offset 28 formed by the curved outer wall section 27 and the flange 23.

Another length of edge connector extrusion 18 is placed on the edge of the adjacent panel. The connectors are identical, but are used in the completed assembly as facing mirror images. Thus, in FIG. 2 the connectors 18 on adjacent panels are from the same extrusion, but face each other as mirror images. This is an important feature of the preferred embodiment of the invention because it enables a single extrusion to be the connector for all the panels.

The connector bridge 20 is an elongated extrusion which, viewed in cross-section, is symmetrical. It is designed to register with parts on the edge connectors to orient the panels in the preselected relative positions in which they are to be permanently secured. For this purpose, the connector 18 is provided with a flat inside flange 26 and a flat flange 29 extending from the outer curved wall 27. The bridge spans the space between edge connectors on adjacent panels and completes the joint between panels. It is important that all parts of an installed connector 18 lie inside imaginary extensions of planes of the outer panel surface. This enables laminating after the connectors are installed to mask the joint.

For structural integrity, it is important that the edge connector be securely fastened to the interior framework of the panel. This may be accomplished in a number of ways. In the illustrated embodiment a sub-connector 31, is riveted to a web 33 of a frame member 16 and then to the connector. Obviously, other methods may be employed to secure the basic connector 18 in final position on its panel.

A bridge or interconnect member 20 fits precisely between the facing connectors and when riveted or otherwise secured to the connectors completes a rigid joint.

The bridge comprises a central base web 36, and spaced apart upright parallel sides 37 thereby defining a channel 38. A pair of flat shelves or flanges 39 extend outwardly at right angles from the upper edges of the channel sidewalls 37 so that upon assembly to the connectors these shelves register in face-to-face relationship with the appropriate flanges on the connector.

In addition to the shelves 39 in register with the connector a second shelf 431 is provided along the lower or opposite side of the bridge and is arranged to register face-to-face with the side flange 26 on the connector. When both connectors are mounted on panels and connected to the bridge, the resulting structure is as shown in FIG. 2. The assembly includes the channel 38 in which wires or tubes may be strung, a top hat cover 42 with spaced-apart legs or sidewalls 43, and a flat top 44 closes the channel. The top walls of the cover register with shelves 29 and 39 of the edge connectors and bridge 20. The assembly is secured together by rivets 32. In connection with riveting, it is important that the extrusions be formed so that access for riveting is from the outside.

In accordance with this invention, an enclosure may be completed by erecting and joininig the vertical sides and ends then the top is simply set in place, and is held by gravity in final proper position for riveting. The dotted lines in FIG. 3 indicate the positioning of parts in final assembly. First the vertical side wall 12 is prepared with the edge connector 18 along the upper edge 19. The bridge 20 is then riveted to the connector. The end walls 13, if used, are connected along the edges using connectors and bridges and the upper edges prepared with a connector and bridge. Then, the roof 14 is prepared with an edge connector 18 along each of its edges. The roof is positioned over the open tapped enclosure and lowered, as shown by the dotted line in FIG. 3, into place so that the faces 26 and 29 rest on the faces 39 and 41 of the bridge. The top hat 42 is put in place and riveted. For final inside covering, a flexible cover strip 44 is snapped into place in performed grooves 46 in the bridge. This covers the rivets and finishes the joint.

Although the invention as shown described in connection with FIGS. 1-4 is for joining panels normal to each other, the joining assembly of the invention is equally adaptable to securing the panels at other angles. The bridges shown in FIGS. 5-6 are designed to provide different angles between the joined panels. In the structure shown in FIGS. 1-4, the panels are joined at right angles. This is because the base web 22 of the bridge 20 is flat. If either of the bridges 47 or 48 (FIG. 5 or 6) are used the angle would be other than 90°. The change is accomplished by substituting a base web 49 or 51 that is bent so that the included angle between panels is more than 90° or less than 90°.

Figure 7:
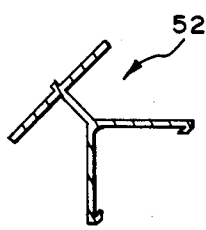
FIG. 7 is a sectional view of still another form of bridge.

The bridge 52 shown in FIG. 7 is similar to that shown in FIGS. 1-6, but is shortened so that the corner is more abrupt. This embodiment still provides the basic advantages of the invention, namely, a single extrusion for the bridge and a single extrusion for the edge connectors.

Figure 8:
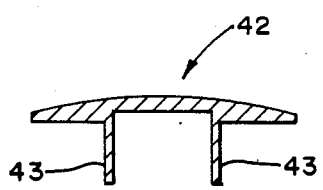
FIG. 8 is a sectional view of a cap for use with bridges such as shown in FIGS. 2 and 3.

The top hat cover 42 may be flat as illustrated in FIGS. 1-4 or it may be rounded to a different finished shape as in FIG. 8. Also the legs may be abreviated if desired.

The extrusion for the edge connector and that for the bridge are keyed to each other to fix the final relative positions of the wall panels for joining. Illustratively, the edge connector 18, when secured to a panel, presents at its other (free) side the flat flanges 29 and 26 that register face-to-face respectively with flat flanges 39 and 41 along one side of the bridge 20. All the flanges are continuous so the areas in register are substantial and result in a rigid secure and precise positioning of the parts for joining. This same mating of parts for positioning will be maintained even though the central web 36 of the bridge changes, as in FIGS. 5 and 6, to change the angle between panels.

In designing the joining assembly, the desired final angle between panels is selected. Then, the connectors and bridge are designed so that they combine to furnish the complete angle. The two connectors are identical so they supply equal degrees of angle and the bridge supplies the rest. In the joint illustrated in FIGS. 1-3, the final angle is 90°; the bridge does not contribute any angularity, while each edge connector makes a 45° turn.

Using the same 45° edge connectors, the angle between panels can be made more or less than 90° simply by using an alternate bridge design such as shown in FIGS. 5-6 in which the base web 36 is bent thereby to yield a different angle between the joined panels than that achieved with a flat web. In such configurations, the cover 42 will be adjusted to accomodate the change.

Having thus described my invention what I desire to have protected by letters patent is defined in the appended claims.

I claim:

1. A joint for securing together the edges of a pair of transverse panels, comprising a pair of edge connectors each connected to one of the panels to be secured, and a bridge positioned between and rigidly secured to both of said edge connectors; each of said connectors being a length of an identical elongated extrusion which is asymmetrical in cross section, each of said edge connectors has means on one side for attachment to the edge of a panel and is provided along substantially its entire other side with a pair of spaced apart connector flanges at least one of which is in a plane transverse to the panel to which said connector is attached; and said bridge is an elongated extrusion that is symmetrical in cross section and has spaced apart along each of its opposite sides two substantially continuous flanges that register simultaneously with said spaced apart connector flanges along the side of said connector nearest said bridge; and said bridge includes a continuous central channel defined by spaced apart sidewalls and a bottom interconnecting the lower ends thereof, one of said continuous flanges on each side of said bridge is connected to and extends outwardly from adjacent the upper edge of one of said channel sidewalls and the other of said continuous flanges is connected to and extends outwardly from adjacent the bottom of the same one of said sidewalls; and said continuous flange extending from adjacent the upper edge of said sidewall is in register with the said flange on said edge connector that is transverse to the plane of the panel to which said edge connector is attached.

2. The joint according to preceding claim 1 with the addition of an elongated cover for said bridge, comprising a continuous cover plate of width sufficient to span said channel in said bridge and overlie said flanges extending outwardly from adjacent the top of said channel, said cover plate having a pair of downwardly extending spaced apart legs adapted to be received in said last named channel so that when said flanges on said bridge and said edge connectors are in register and said legs of said plate are received in said channel, the side portions of said cover plate register in overlying face-to-face relationship with said flanges extending from said sidewalls of said channel.

3. The joint according to preceding claim 1 in which each of said flanges extending from adjacent the lower edge of said sidewalls of said channel on said bridge include a groove adjacent its lower edge to receive and retain a cover plate facing into the included angle between said transverse adjacent panels.

4. The joint according to preceding claim 1 in which said sidewalls of said bridge channel on said bridge flare upwardly and outwardly from the base of said channel, said flanges adjacent the top of said sidewalls are normal thereto, and said base of said channel is higher in the center than at its sides.

5. A joint assembly comprising a pair of elongated edge connectors cut from a first elongated extrusion and a bridge cut from a second elongated extrusion and adapted to be connected between a pair of said edge connectors; said first extrusion being asymmetrical in cross section and having a base, a pair of spaced apart flat surfaced legs depending from said base, a flat sidewall extending upwardly from one side of said base as an extension of one of said legs, an upwardly extending curved member extending upwardly from the opposite edge of said base and curving over the top of said base to terminate thereabove, a flat flange extending angularly over said base from the upper edge of said curved member to terminate above said base at a location above and spaced inwardly from said flat sidewall, and said flat surfaced legs being spaced apart a distance such that they form a continuation of the surface of the interior framework of a laminated panel to which said connector is attached; and said second extrusion being symmetrical in cross section and including a base, an upwardly facing channel on said base defined by said base and by a pair of upwardly extending flat sidewalls, a flat flange extending outwardly from adjacent the top of each of said sidewalls and another flange extending outwardly from adjacent the bottom of each of said sidewalls, said flanges being positioned and dimensioned so that said edge connectors and said bridge may be fitted together with both of said outwardly extending flanges on each side of said channel on said bridge in register in face-to-face relationship simultaneously with said flanges extending above said base of said first extrusion with said flange extending from adjacent the top of said sidewall of said channel on said bridge in register with said flat flange extending angularly from said curved member above said base of said first extrusion.

* * * * *